INVENTORS
HAROLD GRONER
ALFRED BOWEN
BY *Albert J. Kramer*
ATTORNEY

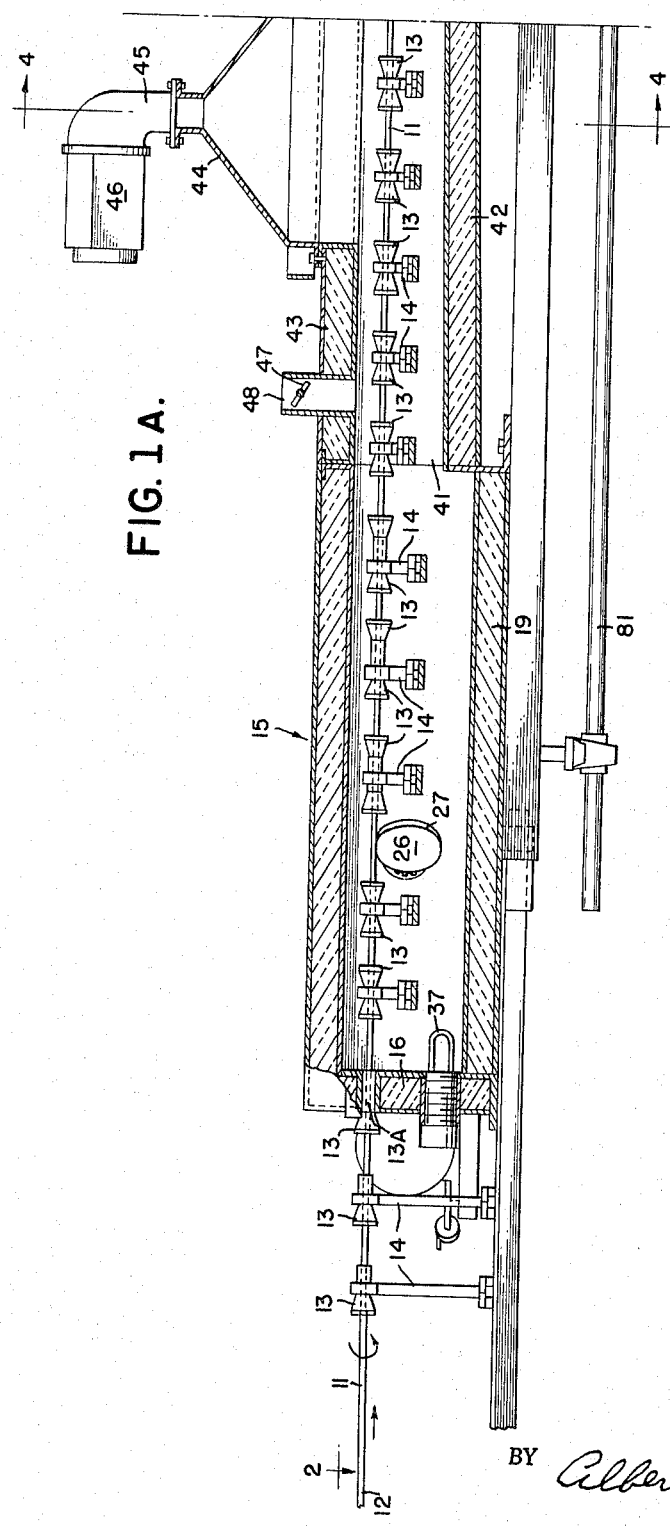

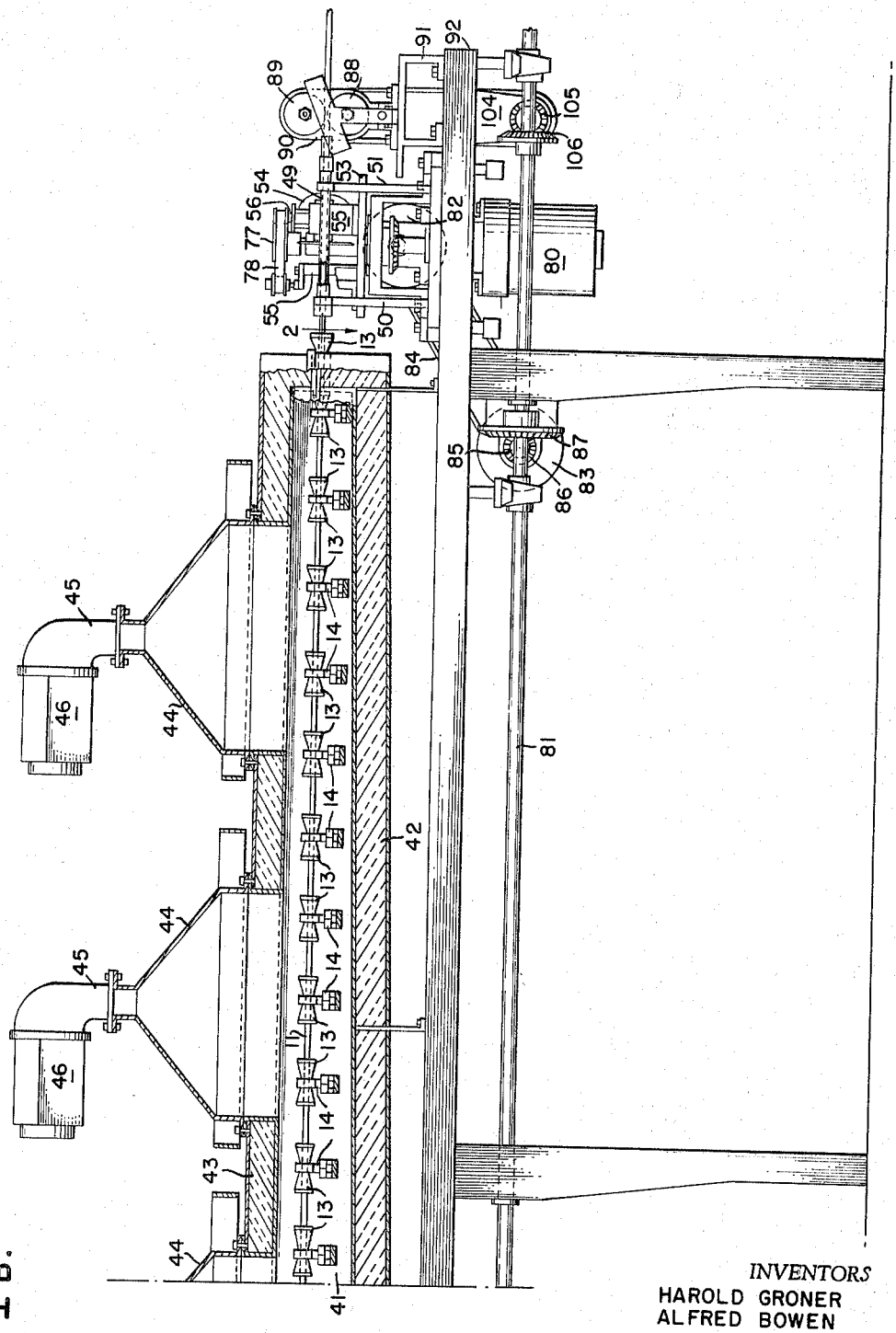

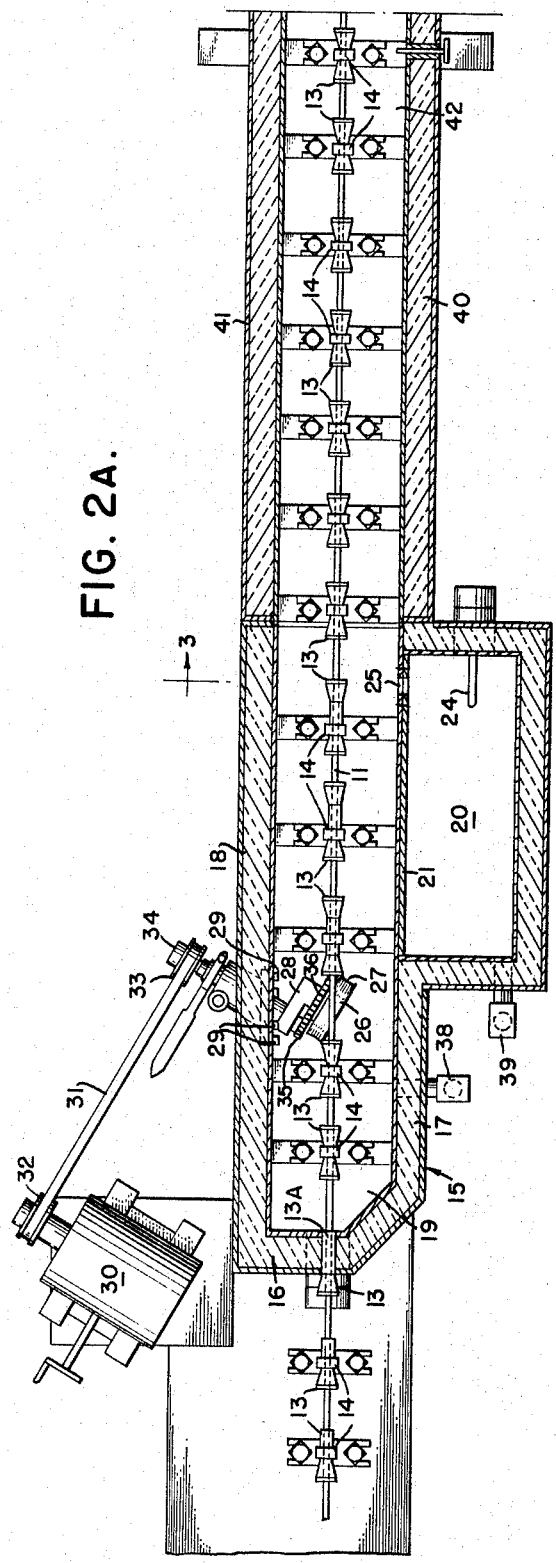
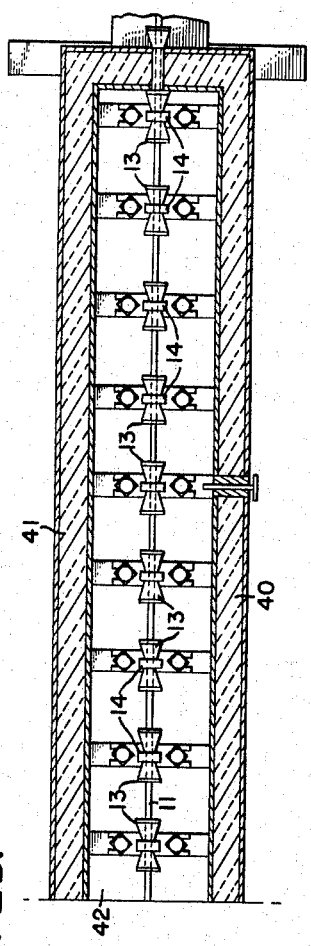

May 2, 1967     H. GRONER ET AL     3,316,820
MACHINE AND METHOD FOR MANUFACTURING DRINKING STRAWS
Filed Sept. 27, 1963     6 Sheets-Sheet 5
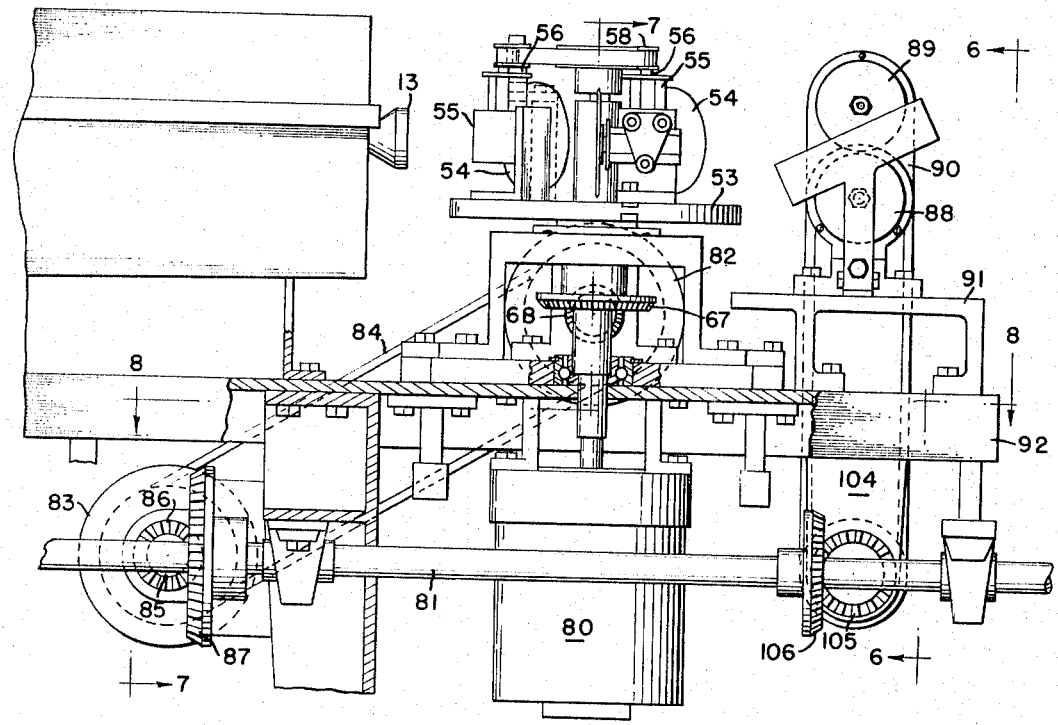
FIG. 5.
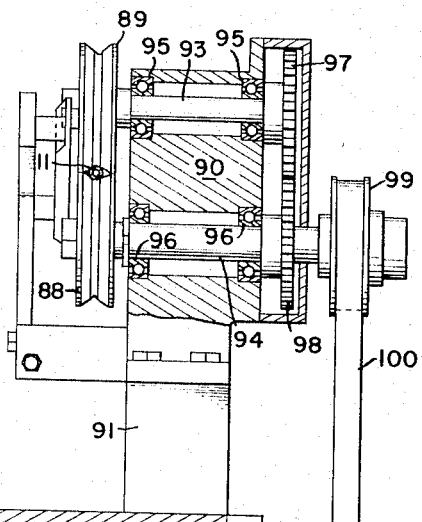
FIG. 6.
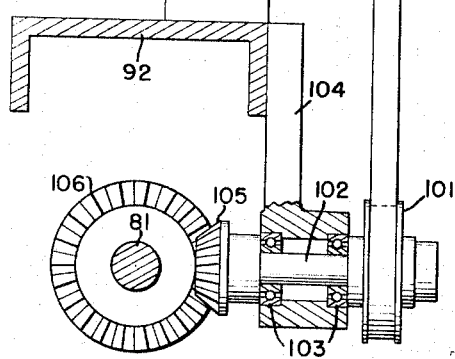
INVENTORS
HAROLD GRONER
ALFRED BOWEN
BY *Albert J. Kramer*
ATTORNEY May 2, 1967

H. GRONER ETAL 3,316,820

MACHINE AND METHOD FOR MANUFACTURING DRINKING STRAWS

Filed Sept. 27, 1963

INVENTORS
HAROLD GRONER
ALFRED BOWEN

BY Albert J. Kramer

ATTORNEY

United States Patent Office 3,316,820
Patented May 2, 1967

3,316,820
MACHINE AND METHOD FOR MANUFAC-
TURING DRINKING STRAWS
Harold Groner and Alfred Bowen, Baltimore, Md., as-
signors to Maryland Cup Corporation, Owings Mills,
Md., a corporation of Maryland
Filed Sept. 27, 1963, Ser. No. 312,037
10 Claims. (Cl. 93—80)

This invention relates to drinking or sipping straws and it is more particularly concerned with a method of manufacturing them and to machines for carrying out the method.

An object of the invention is the provision of a method and of a machine for manufacturing conventional drinking straws, including coating and impregnating a continuous tube of paper formed by a conventional "winder," drying and cutting the waxed tube into straws of desired lengths in a continuous series of operations.

Another object of the invention is the provision of such a method and machine which is automatic in operation, requiring only the feeding of the material to be processed to the machine.

A further object of the invention is the provision of such a machine which is easy to build and operate, which is reliable, and not likely to get out of working order for prolonged periods of use.

These objects, still further objects, and various advantages of the invention over previously known methods and machines for manufacturing drinking straws will be apparent from the following description and accompanying drawing relating thereto.

In the drawing:

FIGS. 1A and 1B are, together, a longitudinal sectional view in elevation of a portion of the machine comprising novel features of the invention.

FIGS. 2A and 2B comprise, together, a longitudinal plan sectional view of the waxing and impregnation units of the embodiment along the line 2—2 of FIGS. 1A and 1B.

FIG. 5 is a view of the cutting unit as shown in FIG. 1B but on a larger scale and with parts broken away.

FIG. 6 is a sectional view along the line 6—6 of FIG. 5.

Figure 3:
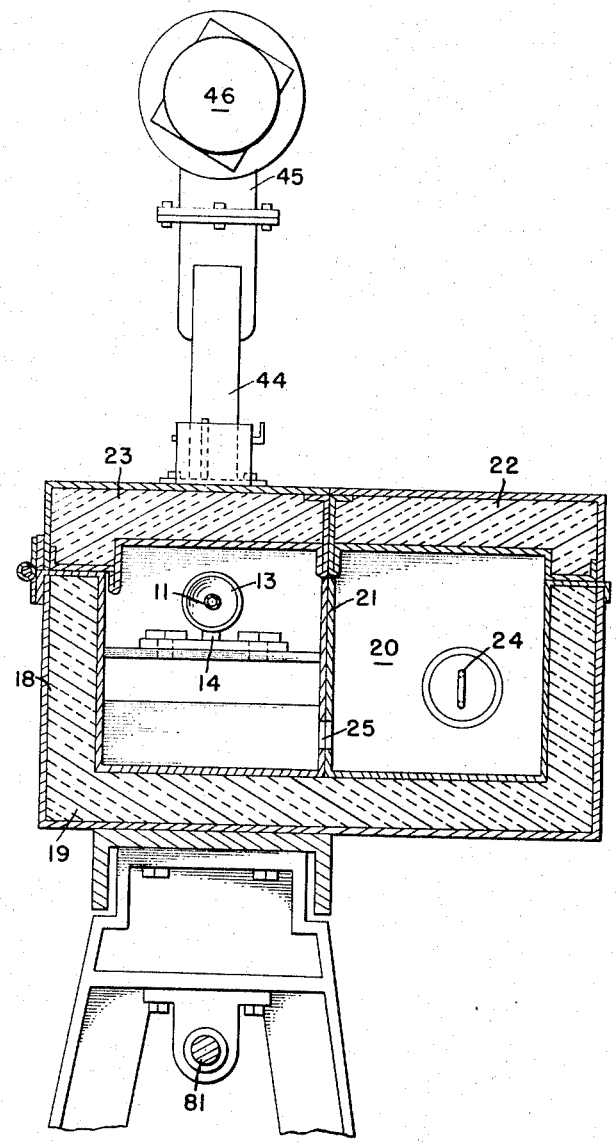
FIG. 3 is a sectional view along the line 3—3 of FIG. 2A.
Figure 4:
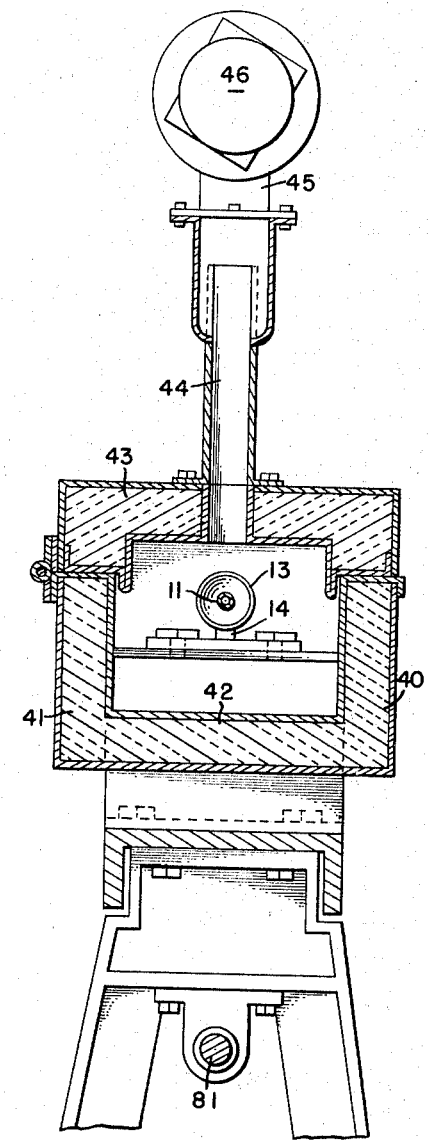
FIG. 4 is a cross sectional view along the line 4—4 of FIG. 1A.
Figure 7:
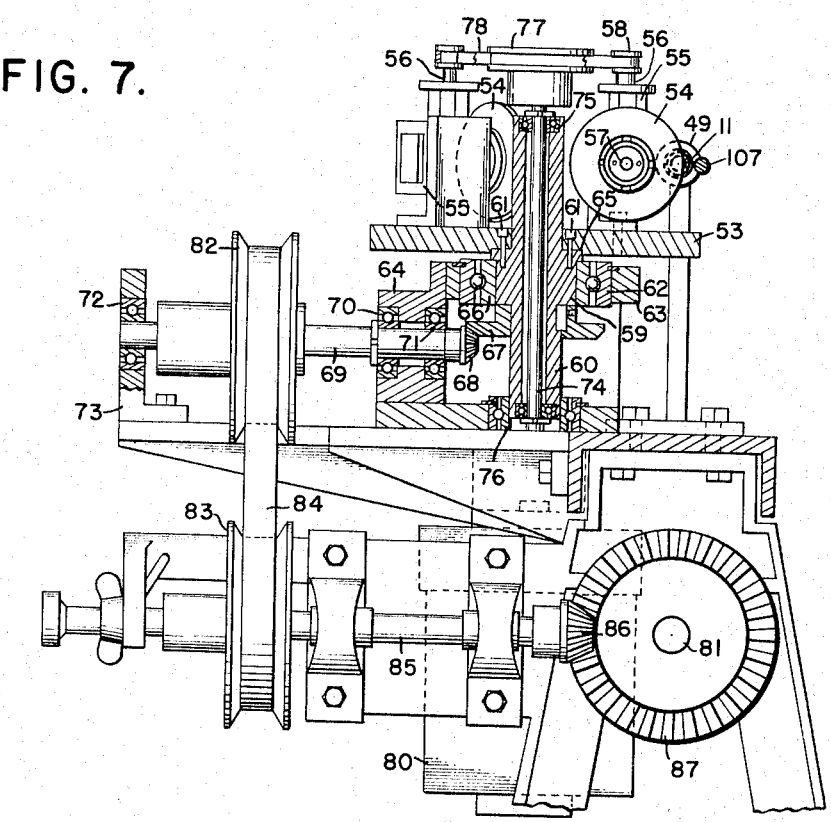
FIG. 7 is a sectional view along the line 7—7 of FIG. 5.
Figure 8:
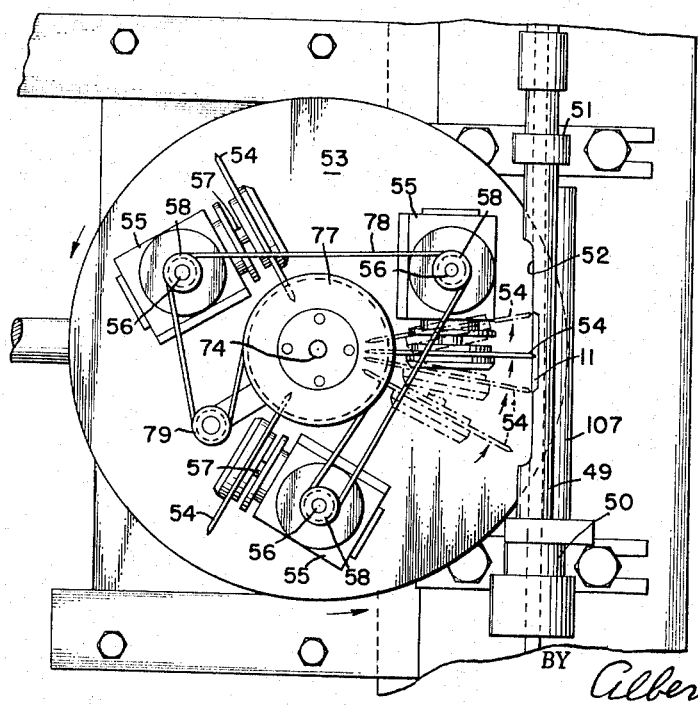
FIG. 8 is a sectional view along the line 8—8 of FIG. 5.

Referring to the drawing with more particularity the embodiment illustrated comprises, generally, a waxing unit, an impregnation unit, a cutting unit and a discharge unit arranged in series.

The waxing or wax applicator unit is adapted to receive a continuous length of a paper tube 11 formed by a conventional device (not shown), generally known as a "winder" which forms the tube by winding a continuous strip of paper (not shown) on a rod-like mandrel 12. These tube forming devices are well known to the art and the present invention is not concerned with any improvements therein per se. The tube 11 discharged from the mandrel 12 is in a continuous form and in a constant state of rotation about its longitudinal axis, as indicated by the directional arrows in FIG. 1A.

The tube 11 is carried by and is passed through a series of elongated rings 13 mounted on spaced brackets 14 or other convenient supports throughout the length of its travel and it enters the waxing unit 15 through one such conduit 13A mounted in the thermally insulated end wall 16 of the unit. These rings 13 are flared on the feed ends to facilitate passage of the tube therethrough and, where feasible, are also flared on the opposite ends to increase their useful life when excess wearing takes place on the feed ends by simply remounting them with the ends reversed.

The waxing unit 15 comprises thermally insulated longitudinal walls 17 and 18 and a bottom wall 19 extending from the end wall 16 on either side of the path of travel of the tube 11.

Adjacent the side wall 17 is a secondary chamber or wax reservoir 20 with a common partition 21 between it and the main portion of the unit. The reservoir 20 is provided with a thermally insulated cover 22 hinged to the partition 21 and the main portion of the unit is provided with a separate thermally insulated cover 23 hinged to the wall 18, substantially as shown.

The reservoir 20 is adapted to contain a charge of wax to be used in impregnating and coating the tube and an electrical heating element 24 is mounted through the wall thereof to contact the wax and maintain it at a fluid temperature suitable for impregnation of the walls of the tube. The melted wax flows from the reservoir through a port 25 in the partition 21 and forms a pool at the bottom of the unit.

Between a consecutive pair of supporting conduits in the waxing unit there is mounted below and adjacent the path of travel of the tube a wax conveyor, such as a waxing wheel 26 the periphery 27 of which is shaped concave and set at an acute angle to the path of travel such that a substantial surface area of the wheel is contacted by the tube as it passes over it. The wheel 26 is mounted on a bracket 28 attached to the wall 18 by bolts 29 and is driven by power from a variable speed motor 30 connected by a belt 31 and pulleys 32 and 33 to a shaft 34 journaled in the bracket. This shaft is also provided with a gear 35 that meshes with and drives a gear 36 concentrically secured to the waxing wheel 26.

The level of fluid wax in the waxing unit is maintained so as to contact the lower end of the waxing wheel whereby when the wheel rotates the wax adheres by surface tension to the periphery of the wheel and is carried around with it to be deposited on the surface of the tube which is rotating while moving linearly across the periphery. The variable speed motor permits changing the speed of rotation of the wheel 26 to change the amount of wax carried thereby in a given period to the moving tube 11. The pool of wax in the waxing unit is also maintained at an optimum fluid temperature by another electric heating element 37 mounted through the end wall 16. Temperature gauges 38 and 39 are also mounted through convenient walls of the reservoir and waxing unit to observe and monitor the temperatures for optimum performance of the device.

At the end of the waxing unit 15, opposite the end wall 16 there is disposed, in abutting relation, the forward end of the impregnating unit which comprises thermally insulated side walls 40 and 41 and a bottom wall 42. The side walls are flush with the corresponding side walls 17 and 18 of the waxing unit and the bottom wall 42 is above and inclined at an angle sloping toward the bottom wall 19 of the waxing unit. The purpose of this is to cause excess wax dropping from the tube 11 and rings 13 in the impregnating unit to flow back into the waxing unit for reuse.

The impregnating unit is also provided with a hinged insulated cover 43 on which there is mounted a series of hoods 44, each connected to the outlet end 45 of a hot air generator 46. The cover 43 also contains a damper 47 to control the discharge of air from the unit through an outlet 48. As the tube 11 with the applied wax enters the unit, the effect of the heat is to drive the liquid wax deeper into and through the pores of the paper walls and thereby completely impregnate the walls and also to coat the inner surface with the wax that gets through the pores.

The greatest amount of heat occurs at the entrance due to the combined hot air from all the generators being forced to escape at the entrance and through the single outlet 48. This insures a complete impregnation.

Upon discharge of the tube from the impregnation unit, the wax solidifies at ambient room temperature and enters the cutting unit.

The cutting unit comprises a horizontal hollow cylinder 49 through which the waxed paper tube passes. This cylinder is mounted on a pair of vertical brackets 50 and 51. The cylinder on one side has a cut-away portion 52 extending about halfway across its diameter to expose the tube for cutting.

On the side of the cylinder facing the cut-down portion 52 there is mounted the cutting turret which comprises a turntable 53 and one or more rotary cutters (3 shown, but the number depends on the length of straws to be made) mounted on the turntable for rotation therewith. These rotary cutters each comprise a conventional right angle gear box 55 having a vertical input shaft 56 at the top and a horizontal output shaft 57 on one side.

To the output shafts 57, circular cutting blades 54 are secured and to the input shafts 56 driving pulleys 58 are secured.

The turntable 53 is secured to the hub 59 of a vertical hollow shaft 60 by bolts 61. The hub is mounted in a ball bearing 62 supported on a collar 63 that is attached to a stationary member 64. A flange 65 of the hub rests on the inner race 66 of the bearing.

A beveled gear 67 is secured to the shaft 60 below the hub 59 and is meshed with a bevel gear 68 on the end of the horizontal shaft 69. The shaft 69 is journaled in bearings 70 and 71 of the stationary member 64 and another bearing 72 in a stationary member 73 spaced from and aligned with the bearings 70 and 71.

Within the hollow shaft 60 there is disposed a shaft 74 rotatably mounted relative thereto in ball bearings 75 and 76. The upper end of the shaft extends above the shaft 60 and is secured to a drive pulley 77. A belt 78 engages the pulley 77 and also the pulley 58 and conventional idler tensioning pulley 79.

The lower end of the shaft 74 extends below the hollow shaft 60 and is connected to the armature of an electric motor 80.

By these means power is delivered from the motor 80 to drive the cutting blades 54 and, independently, power is delivered from the shaft 69 to drive the turntable. The shaft 69 is powered by a main shaft 81 extending along the length of the machine through pulleys 82 and 83, belt 84, cross shaft 85 and bevel gears 86 and 87. The main shaft 81 is also used to drive the winder mechanism (not shown) of the mandrel 12 thereby the speed of travel of the tube through the apparatus is synchronized with the speed of rotation of the turntable. With any given peripheral spacing of the blades 54 on the turntable 53 a fixed length of straw will be severed on each pass of a blade across the path of the tube 11. The speed of rotation of the turntable is, moreover, selected by the gearing provided so that the peripheral speed of the turntable is substantially equal to the speed of travel of the tubing. This results in a smooth cutting action as the cutting blades each come in contact with the rotating tube moving toward the discharge end of the machine.

The straws, as they are cut off by the cutting blades, enter the discharge unit which consists of a pair of sheaves, namely, a lower sheave 88 and an upper sheave 89 directly above, mounted in a block 90 on a pedestal 91 secured to the frame 92 of the machine.

The peripheries of these sheaves are concave and shaped so as to receive between them the straws that are severed by the cutting unit. Each sheave is secured to a shaft 93, 94, respectively, which are rotatably mounted in the block 90 in bearings 95 and 96. The opposite ends of the shaft are provided with spur gears 97 and 98, respectively, which are in meshed relation, thereby effecting rotation of the sheaves in opposite directions. One of the shafts, say shaft 94, extends beyond its gear 98 to receive a pulley 99 which is driven by belt 100 engaging a pulley 101. The pulley 101 is secured to a stub shaft 102 mounted in bearings 103 on a bracket 104 attached to the frame 92 of the machine and the opposite end of the stub shaft carries a beveled gear 105 which is in meshed relation with a beveled gear 106 secured to the main shaft 81.

The purpose of the discharge unit is to carry the severed straw to a discharge point on the opposite side, such as a belt conveyor (not shown), or other station where the final straws can be collected for packaging.

The action of the cutting unit, in practice, frequently causes a build-up of wax in the cylinder 49 which adversely affects a smooth flow of the tube therethrough. To avoid this condition and assure free movement of the tube through the cylinder, an electrical heating element 107 is disposed along the side of the cylinder to maintain it at a temperature which liquefies wax deposited thereon without liquefying the wax on the tube itself as it passes rapidly through the cylinder.

Having thus described our invention, we claim:

1. A machine for manufacturing drinking straws comprising a paper tube forming mandrel, means defining a longitudinal path of travel for a rotating tube discharged by the mandrel, said means being adapted to support the rotating tube along the path of travel, a wax conveyor adjacent a portion of the path of travel, said conveyor being adapted to convey liquefied wax to the path of travel, means for feeding liquefied wax to the conveyor, means for impregnating the tube with wax applied to it by the conveyor, and means for severing from the end of the tube a section of a given length as the tube moves along the path of travel.

2. A machine as defined by claim 1 in which the wax conveyor comprises a wheel rotatably mounted adjacent the path of travel, means for supporting a pool of liquefied wax in contact with the wheel, and means for rotating the wheel.

3. A machine as defined by claim 2 in which the periphery of the wheel is concavely shaped and the plane of the wheel is disposed at an acute angle to the path of travel of the tube.

4. A machine as defined by claim 2 in which the means for supporting a pool of liquefied wax in contact with the wheel comprises a container surrounding the path of travel, means carried by the container for supporting the tube along the path of travel and means connected to the container for rotatably supporting the wheel in a position between the path of travel and the level of liquid in the container.

5. A machine as defined by claim 1 and a discharge unit for receiving sections of the tube severed by the severing means and transferring them to a discharge station.

6. A machine as defined by claim 5 in which the discharge unit comprises a pair of juxtaposed rotary wheels positioned to receive and mutually engage a section of the tube between their respective peripheries and means for rotating said wheels in opposite directions.

7. A machine as defined by claim 6 in which the peripheries of the wheels are concave to prevent lateral displacement of the severed sections relative thereto.

8. A machine as defined by claim 1 in which the severing means comprises a turret having a turntable, a circular cutting blade rotatably mounted on the turntable in a plane at right angles to the plane of the turntable, means for rotating the turntable and means for rotating the blade.

9. The method of forming a drinking straw comprising forming a continuous tube of paper, rotating the tube while moving it longitudinally, applying liquefied wax to the exterior surface of the rotating tube, heating the wax applied to the tube as the tube rotates and at a temperature and for a period sufficient to cause the applied wax to penetrate the pores of the paper and coat the inside surface of the tube, thence solidifying the wax carried by the tube and then cutting sections of desired lengths from the end of the tube.

10. The method as defined by claim 9 in which the tube is continuously rotated during the application of the wax, the impregnation of the tube with the wax, and the cutting of the tube in sections.

References Cited by the Examiner

UNITED STATES PATENTS

| | | | |
|---|---|---|---|
| 1,690,209 | 11/1928 | Smith | 83—337 XR |
| 2,167,589 | 7/1939 | Schutz | 118—232 XR |
| 2,212,915 | 8/1940 | Dieffenbach | 93—80 |
| 2,502,628 | 4/1950 | Becht | 93—80 XR |
| 3,068,934 | 12/1962 | Mauck et al. | |
| 3,118,790 | 11/1964 | Gonsalves | 118—244 XR |

BERNARD STICKNEY, *Primary Examiner.*